United States Patent
Mori et al.

(10) Patent No.: US 8,512,565 B2
(45) Date of Patent: Aug. 20, 2013

(54) SOLID-LIQUID SEPARATOR WITH SELF-PRIMING PUMP

(75) Inventors: Yoji Mori, Tokyo (JP); Yoji Karasawa, Tokyo (JP); Yasuichi Haga, Tokyo (JP); Koji Sakamoto, Tokyo (JP)

(73) Assignee: World Chemical Co., Ltd, Tokyo (JP)

( * ) Notice: Subject to any disclaimer, the term of this patent is extended or adjusted under 35 U.S.C. 154(b) by 347 days.

(21) Appl. No.: 12/929,442

(22) Filed: Jan. 25, 2011

(65) Prior Publication Data
US 2011/0192771 A1  Aug. 11, 2011

(30) Foreign Application Priority Data
Feb. 9, 2010  (JP) ................................. P2010-26493

(51) Int. Cl.
*B01D 17/038* (2006.01)
*B01D 21/26* (2006.01)

(52) U.S. Cl.
USPC ..... 210/257.1; 210/258; 210/261; 210/416.1; 210/512.2; 210/304; 210/121; 210/119

(58) Field of Classification Search
USPC ............. 210/512.1, 512.2, 416.1, 257.1, 258, 210/259, 262, 261, 304, 119, 121, 125, 126, 210/128, 787, 788, 800, 801, 806; 209/725, 209/726, 727, 728, 729, 732, 733, 734
See application file for complete search history.

(56) References Cited

U.S. PATENT DOCUMENTS

| | | | | |
|---|---|---|---|---|
| 2,094,275 A * | 9/1937 | Mitchell | ........................ | 423/110 |
| 3,091,334 A * | 5/1963 | Morton | ......................... | 209/210 |
| 3,612,276 A * | 10/1971 | Lowe | ............................. | 209/158 |
| 3,892,662 A * | 7/1975 | Stout | ............................. | 210/787 |
| 5,080,792 A * | 1/1992 | McGovern et al. | ......... | 210/512.1 |
| 5,110,457 A * | 5/1992 | Krawl et al. | ................... | 210/787 |
| 5,300,222 A * | 4/1994 | Broussard, Sr. | .............. | 210/202 |
| 6,398,973 B1 * | 6/2002 | Saunders et al. | .............. | 210/788 |
| 6,818,033 B2 * | 11/2004 | North | ............................... | 55/345 |
| 8,257,588 B2 * | 9/2012 | Mori et al. | ................... | 210/257.1 |
| 2004/0103785 A1* | 6/2004 | North | .............................. | 95/271 |
| 2004/0159613 A1* | 8/2004 | Bair et al. | ...................... | 210/726 |
| 2005/0087080 A1* | 4/2005 | Yoshida et al. | ............... | 100/104 |
| 2006/0086253 A1* | 4/2006 | Gaur et al. | ....................... | 96/321 |

FOREIGN PATENT DOCUMENTS

| | | |
|---|---|---|
| JP | 56-161851 | 12/1981 |
| JP | 61-028473 | 2/1986 |
| JP | 2003-225514 | 8/2003 |
| JP | 2005-279609 | 10/2005 |
| JP | 2006-061897 | 3/2006 |
| WO | WO 00/09242 | 2/2000 |
| WO | WO 2004/026485 | 4/2004 |

* cited by examiner

*Primary Examiner* — David C Mellon
(74) *Attorney, Agent, or Firm* — Roylance, Abrams, Berdo & Goodman LLP

(57) ABSTRACT

A solid-liquid separator prevents wear of a self-priming liquid pump connected to a cyclone mechanism and a solid-liquid mixture can be purified at low cost. The separator separates sludge in the liquid by a cyclone in a separation portion directly or indirectly connected to a suction of the upstream side of the pump. The separation portion has a first and second cyclones with the first cyclone disposed in said second cyclone coaxially. A tank disposed under the cyclones collects separated from the liquid.

12 Claims, 8 Drawing Sheets

(A) when closed (B) when open (A) when closed (B) when open

SOLID-LIQUID SEPARATOR WITH SELF-PRIMING PUMP

BACKGROUND OF THE INVENTION

1. Field of the Invention

The present invention relates to a solid-liquid separator with self-priming pump and specifically relates to a solid-liquid separator with self-priming pump that separates sludge and other foreign matter by a centrifugal force of a liquid cyclone.

2. Description of the Prior Arts

In regard to a purification apparatus for a solid-liquid mixture that is a fluid/liquid to be treated in which sludge, solid debris, particulate matter, dust, and other foreign matter are mixed, there is known an art of feeding the solid-liquid mixture into a cyclone cylinder by a pump and performing cyclone separation of the sludge, etc., in the solid-liquid mixture by a swirl flow generated inside the cyclone cylinder (see, for example, Japanese Patent Pre-publication No. 2006-61897). In the present Specification, sludge shall refer not only to sludge but also inclusively to slurry, which is a flock-like fluid suspension that contains the sludge.

Although the purification apparatus based on cyclone separation exhibits a high separation performance in comparison to separation techniques that utilize a bag filter or a cartridge filter, it operates in connection with a discharging system of the pump and thus accompanies a problem of wear and damage of the pump arrangement by the sludge. That is, the purification apparatus based on cyclone separation is intended for solid-liquid separation and the wear of the pump is thus not taken into consideration at all.

In regard to the problem of wear and damage of the pump arrangement, measures have been taken in regard to structure and material of a main pump body to provide a pump that is strong against sludge liquids, in other words, accommodations at the pump side, such as use of a wear-resistant material in the main pump body and arranging of a pump structure through which foreign matter passes readily, have been made thus far.

SUMMARY OF THE INVENTION

There are problems with the above measures, that is, in a case where the main pump body is manufactured from a wear-resistant material, cost increases due to use of the wear-resistant material, and in a case of arranging a structure through which foreign matter passes readily, a large restriction is placed on the pump structure.

Thus an object of the present invention is to provide a solid-liquid separator with self-priming pump with which wear of a self-priming liquid pump connected to a cyclone mechanism can be prevented and a solid-liquid mixture can be purified at a low cost without requiring a special arrangement (special material or special structure) for the pump.

The object of the present invention is achieved by the following arrangement.

A solid-liquid separator with self-priming pump including a pump portion having a self-priming liquid pump, and a separation portion in which a liquid is introduced from an exterior into a cyclone cylinder by a suction force of the self-priming liquid pump of the pump portion and a swirl flow is generated in the liquid to perform cyclone separation of sludge contained in the liquid, the solid-liquid separator with self-priming pump having an arrangement where the separation portion is directly or indirectly connected to a suction system of the self-priming liquid pump that is an upstream side of the pump portion, the separation portion has an inner/outer double arrangement that includes a first cyclone mechanism having a first cyclone cylinder disposed at an outer side, and a second cyclone mechanism in communication with the first cyclone mechanism and having a second cyclone cylinder having a smaller diameter than the first cyclone cylinder by being disposed coaxial to a swirling axis of the first cyclone mechanism and at an inner side of the first cyclone cylinder, the first cyclone mechanism is arranged to perform a first cyclone separation by the liquid being introduced from the exterior into the first cyclone cylinder and swirled along an inner peripheral wall of the first cyclone cylinder, the second cyclone mechanism is arranged to perform a second cyclone separation by the liquid, subjected to the first cyclone separation by the first cyclone mechanism, being introduced into the second cyclone cylinder and swirled along an inner peripheral wall of the second cyclone cylinder, a sludge storage tank, storing the sludge cyclone-separated by either or both of the first cyclone mechanism and the second cyclone mechanism, is disposed below the first cyclone mechanism and the second cyclone mechanism, the storage tank has a two-tank arrangement including a first sludge storage tank disposed below the first cyclone mechanism and storing the sludge cyclone-separated by the first cyclone mechanism, and a second sludge storage tank disposed below the second cyclone mechanism, storing the sludge cyclone-separated by the second cyclone mechanism, and being capable of sealing a lower side of the second cyclone cylinder, the second sludge storage tank is disposed above the first sludge storage tank with a bottom portion of the second sludge storage tank being open-able and the sludge inside the second sludge storage tank being dropped into the first sludge storage tank by the opening of the bottom portion, a float valve, opening and closing the bottom portion of the second sludge storage tank by either or both of the suction force of the self-priming liquid pump of the pump portion and a buoyant force, is disposed at the bottom portion of the second sludge storage tank, and the float valve has the arrangement of (1) or (2) below.

(1) An arrangement by which the closing of the bottom portion by the float valve is opened when, during stoppage of the separation process, that is, during stoppage of the self-priming liquid pump, a weight of the sludge stored above the float valve becomes greater than a sum of the buoyant force of the float valve and the suction force that decreases due to the stoppage of the self-priming liquid pump.

(2) An arrangement by which the closing of the bottom portion by the float valve is opened when, during either or both of stoppage of the self-priming liquid pump and air intake, a liquid level of the solid-liquid mixture decreases below a position of the bottom portion.

The solid-liquid separator with self-priming pump can have an air vent hole that puts in communication an upper portion of the first cyclone mechanism and an upper portion of the second cyclone mechanism is provided.

The solid-liquid separator with self-priming pump the separation portion can have a detecting unit, for detecting an amount of sludge stored in the first sludge storage tank, disposed outside the first cyclone mechanism, the second cyclone mechanism, and the first sludge storage tank and along a connection pipe passage connecting the first sludge storage tank with either the first cyclone cylinder of the first cyclone mechanism or the second cyclone cylinder of the second cyclone mechanism, with the detecting unit having an arrangement including a take-off pipe that is a portion of the connection pipe extend-ably connected to an interior of the first sludge storage tank and taking out the liquid at an upper portion of the interior of the first sludge storage tank, a checking portion connected to the take-off pipe and having a transparent portion enabling viewing of a state of a liquid passing through an interior thereof, and a return pipe that is another portion of the connection pipe connecting the checking portion and the first cyclone cylinder or the second cyclone cylinder and returning the liquid taken out from the first sludge storage tank to the interior of the first cyclone cylinder or an interior of the second cyclone cylinder.

The solid-liquid separator with self-priming pump can also have an opening/closing valve controlling passage of liquid into the detecting unit and disposed at any location along a liquid passage of the detecting unit.

The solid-liquid separator with self-priming pump can include a discharge pipe connecting the checking portion of the detecting unit and the self-priming liquid pump of the pump portion, and where, when the sludge is confirmed to be present in the liquid passing through the checking portion of the detecting unit, the introduction of the solid-liquid mixture from the exterior of the separation portion can be stopped, air can be taken into the separation portion, and a liquid present inside the separation portion and above an upper surface of the sludge stored in the first sludge storage tank can be discharged by the self-priming liquid pump via the detecting unit and the discharge pipe to enter a state enabling discarding of the sludge inside the first sludge storage tank.

DETAILED DESCRIPTION OF PREFERRED EMBODIMENT(S)

The present invention shall now be described in detail in accordance with the attached drawings.

First, a first embodiment of the present invention shall be described based on FIG. 1 to FIG. 6.

A solid-liquid separator with self-priming pump (may hereinafter be referred to simply as the "separator") according to the present invention is mainly arranged from a pump portion 2 having a self-priming liquid pump 21, and a separation portion 1 in which a liquid is introduced from an exterior into a cyclone cylinder by a suction force of the self-priming liquid pump 21 of the pump portion 2 and a swirl flow is generated in the liquid to perform cyclone separation of sludge contained in the liquid.

Figure 1:
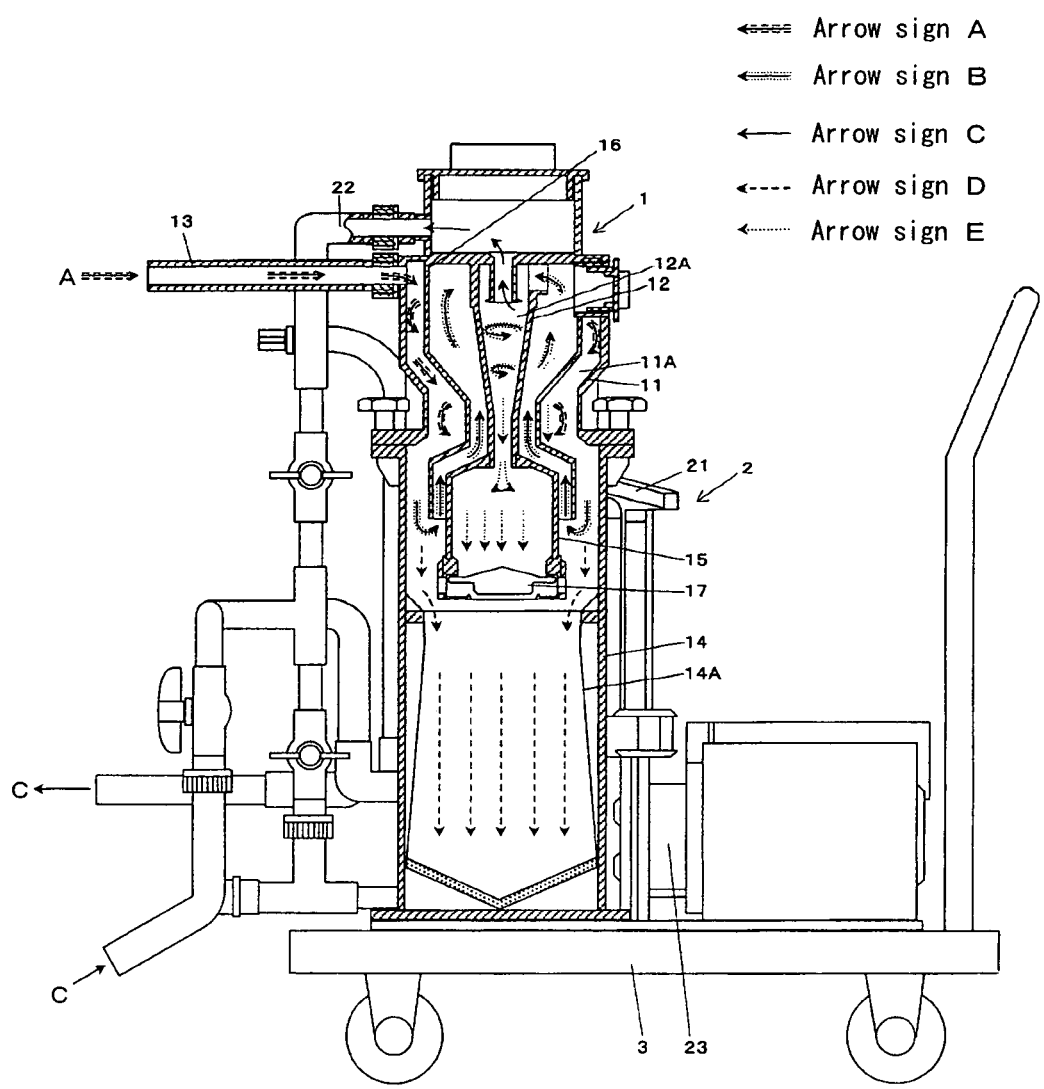
FIG. 1 is a front view of a first embodiment of the present invention and shows a separator portion in a sectional view.
Figure 2:
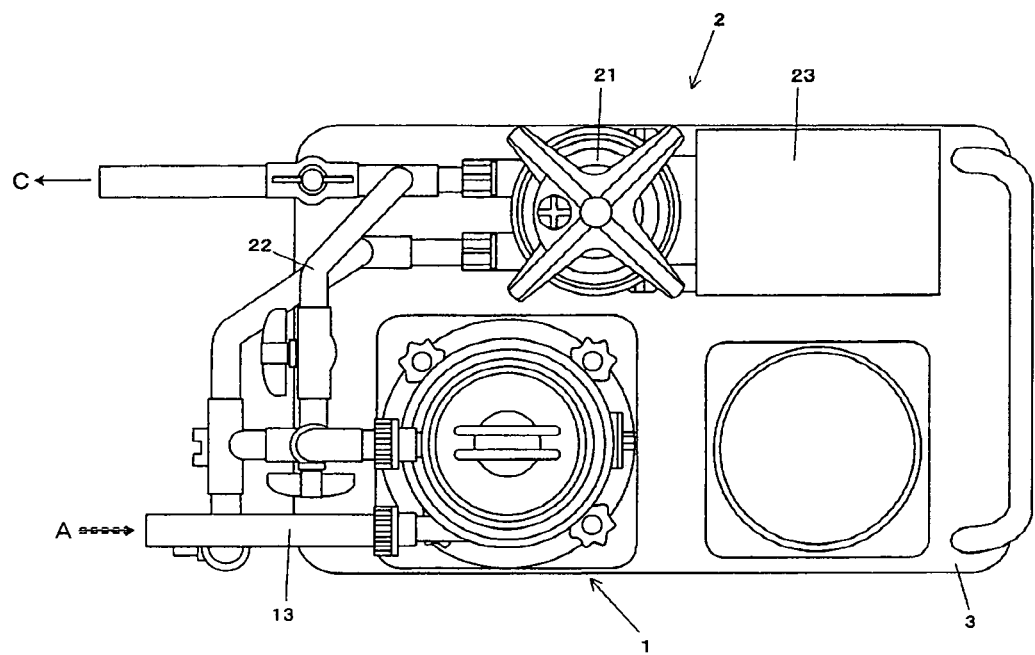
FIG. 2 is a plan view of the first embodiment of the present invention.
Figure 3:
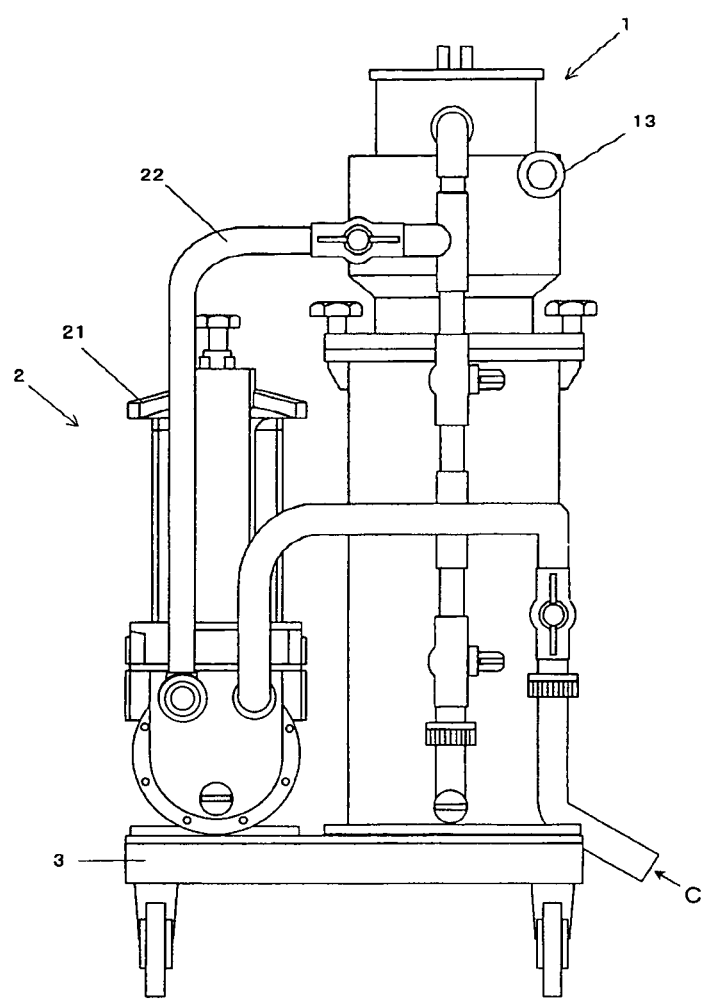
FIG. 3 is a left side view of the first embodiment of the present invention.

As shown in FIG. 1 to FIG. 3, the first embodiment is provided with a compact, movable arrangement by the separation portion 1 and the pump 2 being set on a dolly 3.

As shown in FIG. 1 to FIG. 3, in the separator according to the present invention, the separation portion 1 is directly or indirectly connected to a suction system of the self-priming liquid pump 21 that is an upstream side of the pump portion 2.

The separation portion 1 has an inner/outer double arrangement that includes a first cyclone mechanism having a first cyclone cylinder 11 disposed at an outer side, and a second cyclone mechanism in communication with the first cyclone mechanism and having a second cyclone cylinder 12 having a smaller diameter than the first cyclone cylinder 11 by being disposed coaxial to a swirling axis of the first cyclone mechanism and being disposed at an inner side of the first cyclone cylinder 11.

In the FIG. 1, arrow sign A shows flow of solid-liquid mixture in which sludge is not separated yet. Arrow sign B shows flow of solid-liquid mixture from which sludge with large specific gravity and large particles have been separated and removed. Arrow sign C shows flow of liquid from which sludge with small specific gravity and small particles have been separated and removed. Arrow sign D shows flow of sludge with large specific gravity and large particles. Arrow sign E shows flow of sludge with small specific gravity and small particles.

First, the first cyclone mechanism introduces the sludge-containing liquid (solid-liquid mixture) from the exterior of the separator into the first cyclone cylinder 11 via a pipe 13. The introduced liquid is swirled along an inner peripheral wall 11A of the first cyclone cylinder 11 to perform a first cyclone separation, and the sludge with the large specific gravity and large particles in the liquid is separated at this stage.

The sludge separated by the first cyclone separation by the swirl flow inside the first cyclone cylinder 11 drops into and is stored in a first sludge storage tank 14 disposed below the first cyclone cylinder 11.

The liquid with which the first cyclone separation inside the first cyclone cylinder 11 of the first cyclone mechanism has been completed is then introduced into the second cyclone cylinder 12 of the second cyclone mechanism. A second cyclone separation is performed for the introduced liquid by making it swirl along an inner peripheral wall 12A of the second cyclone cylinder 12, and the sludge with the smaller specific gravity and smaller particles, which could not be separated by the first cyclone separation, is thereby separated.

The sludge separated by the second cyclone separation by the swirl flow inside the second cyclone cylinder 12 drops into and is stored in a second sludge storage tank 15-disposed below the second cyclone cylinder 12. The second sludge storage tank 15 stores the sludge and is arranged to be capable of sealing a lower side of the second cyclone cylinder 12.

Figure 4:
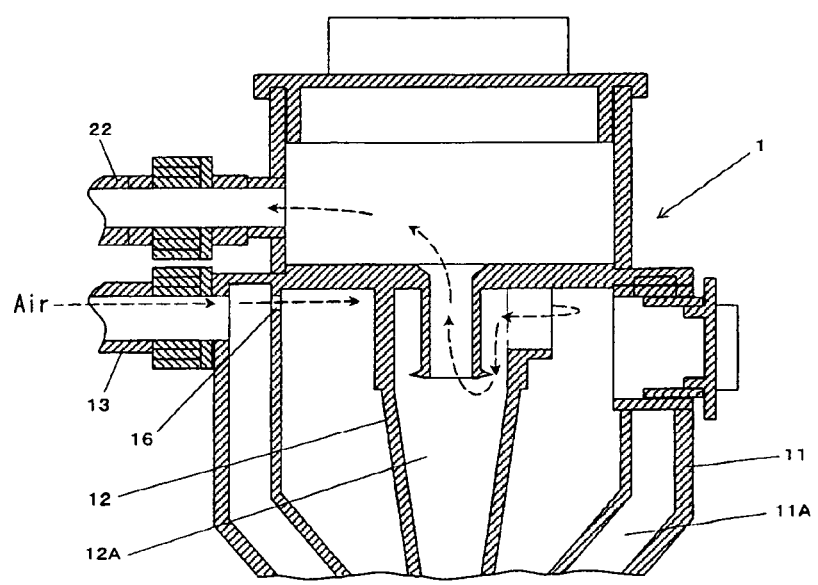
FIG. 4 is a sectional view of a state of discharge of air that has entered inside a first cyclone mechanism.

Also, preferably, an upper portion of the first cyclone mechanism and an upper portion of the second cyclone mechanism are put in communication by an air vent hole 16 being provided as shown in FIG. 4. Although when air from outside the separator enters into the first cyclone mechanism along with the introduction of the solid-liquid mixture, there is a potential problem that the entered air gradually accumulates at an upper portion of the first cyclone cylinder 11 and the cyclone separation stops functioning when an amount of the accumulated air becomes large, the upper portion of the first cyclone mechanism and the upper portion of the second cyclone mechanism are put in communication by the air vent hole 16 and the air that entered into the first cyclone mechanism is thereby passed to the upper portion of the second cyclone cylinder 12 through the air vent hole 16 and thereafter suctioned from the upper portion of the second cyclone cylinder 12 and rapidly discharged to the exterior by the self-priming liquid pump 21. Lowering of efficiency of cyclone separation can thus be prevented even in the case where air from the exterior entered into the separation portion 1. In FIG. 4, a flow of the entered air is indicated by long broken lines.

After a large portion of the sludge contained in the liquid has been separated by the two-stage cyclone separation by the first cyclone mechanism and the second cyclone mechanism of the separation portion 1, the liquid that has been subject to the separation process is fed from an upper side of the second cyclone mechanism to a pump portion 2 connected to a downstream side of the separation portion 1 via a pipe 22. The respective liquid feeding steps, that is, not only the introduction of the liquid into the separator and the cyclone separation in the separation portion 1, but also the introduction from the separation portion 1 to the pump portion 2 are carried out by suction by the self-priming liquid pump 21 of the pump portion 2. A single round of the process is ended for the liquid by being suctioned by the self-priming liquid pump 21 being passed through the pump portion 2 and fed outside the system or back to an original liquid tank. The symbol 23 in the figure indicates a motor for driving the self-priming liquid pump 21.

The cyclone mechanism employed in the separation portion 1 according to the present invention has an arrangement that lacks a driving portion in the cyclone mechanism itself and where the liquid introduced into the separator by a liquid suction force of the connected self-priming liquid pump is lead outside a main body of the separator after being subject to the separation process, and is a so-called double cyclone mechanism, which, among known and publicly used cyclone mechanisms that perform solid-liquid separation, has the first cyclone mechanism and the second cyclone mechanism and performs the two-stage separation, and employs the mode of the inner/outer double arrangement in which the cyclone cylinders, with the swirl axes during cyclone separation being coaxial and being differed in swirl diameter as mentioned above, are disposed in double at inner and outer sides. Although a shape of the first cyclone cylinder 11 (and the inner wall portion thereof) may be a conical shape (inverted conical shape) with which the lower side is narrowed as shown in the present embodiment, the shape may also be a cylindrical shape that is substantially equal in diameter from the upper side to the lower side as in the first cyclone cylinder 11 (and the inner wall portion thereof) of a second embodiment to be described below (see FIG. 7 and FIG. 8). Further, the second cyclone cylinder 12 may also likewise have a cylindrical shape.

With the cyclone mechanism with the inner/outer double arrangement employed in the present invention, a compact arrangement can be realized in comparison to a mode in which the two cyclone mechanisms are connected in parallel or connected in two stages vertically.

The sludge storage tank that stores the cyclone-separated sludge has the two-tank arrangement in which the first sludge storage tank 14, storing the sludge separated and dropped by the first cyclone separation, is disposed below the first cyclone cylinder 11, and the second sludge storage tank 15, storing the sludge separated and dropped by the second cyclone separation, is disposed below the second cyclone cylinder 12 as illustrated in the present embodiment.

Further, as illustrated in the present embodiment, the sludge storage tank preferably has the arrangement where the second sludge storage tank 15 is disposed above the first sludge storage tank 14, the bottom portion of the second sludge storage tank 15 is capable of being opened, and the sludge inside the second sludge storage tank 15 can be dropped into the first sludge storage tank 14 by the opening of the bottom portion.

Figure 5:
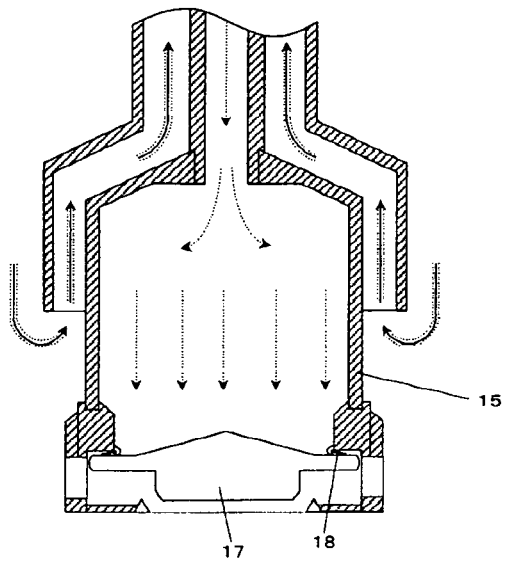
FIG. 5 is a schematic explanatory diagram of an example of an opening arrangement for a bottom portion of a second sludge storage tank.
Figure 5:
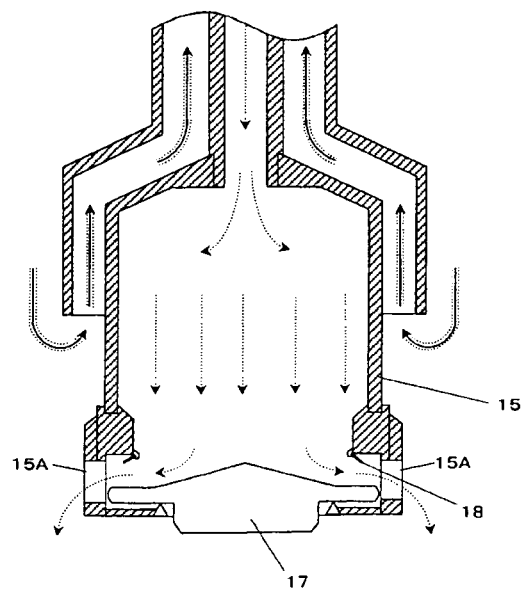

As a specific arrangement for opening/closing the bottom portion of the second sludge storage tank 15, a valve-like member capable of opening and closing the bottom portion is disposed, and in the present embodiment shown in FIG. 1 to FIG. 3, a float valve 17 arranged to be capable of closing (see FIG. 5A) and opening (see FIG. 5B) by a vertical movement as shown in FIG. 5 is employed. With this arrangement, when the bottom portion of the second sludge storage tank 15 is opened by lowering of the float valve 17, the sludge accumulated inside the second sludge storage tank 15 is discharged through sludge discharge holes 15A, drops, and is stored in the first sludge storage tank 14 disposed below. With the present arrangement, by making an upper surface of the float valve 17 conical as shown in FIG. 5, the sludge can be discharged smoothly from the sludge discharge holes 15A.

Figure 6:
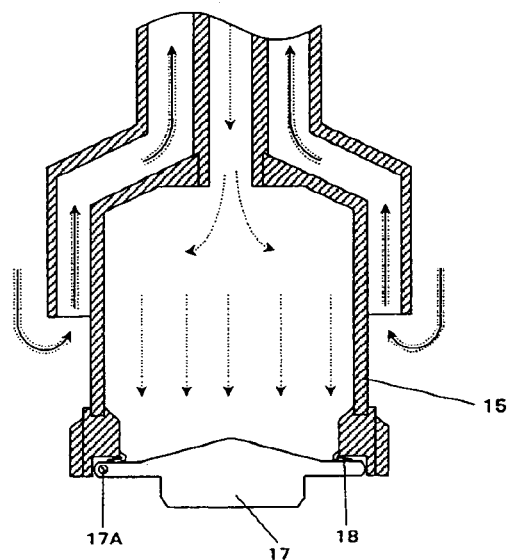
FIG. 6 is a schematic explanatory diagram of another example of an opening arrangement for a bottom portion of a second sludge storage tank.
Figure 6:
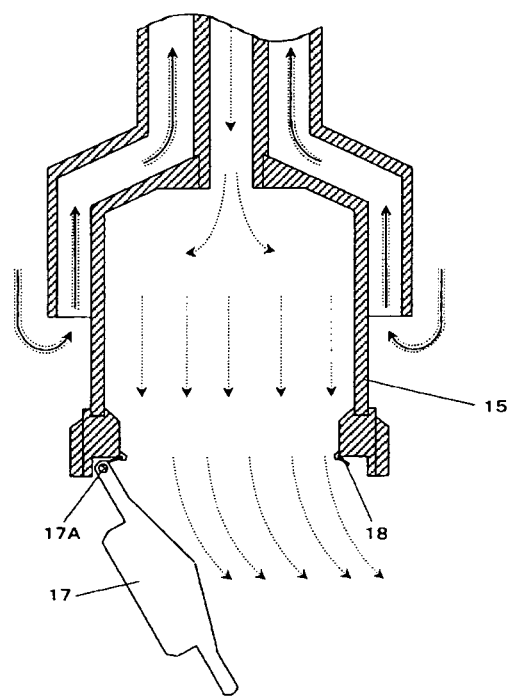

Also, the float valve 17 is not restricted to an arrangement of opening/closing by a vertical movement as shown in FIG. 5, but may be arranged to be capable of closing (see FIG. 6A) and opening (see FIG. 6B) with an axis 17A as a pivot as shown in FIG. 6. With this arrangement, when the bottom portion of the second sludge storage tank 15 is opened by the float valve 17 pivoting downward about the axis 17A as the pivot, the sludge accumulated in the second sludge storage tank 15 drops downward and is stored in the first sludge storage tank 14 disposed below.

In FIG. 5 and FIG. 6, the symbol 18 indicates a seal portion for sealing the bottom portion of the second sludge storage tank 15 and maintaining a negative pressure inside the second cyclone cylinder 12 when the bottom portion is closed by the float valve 17, and by the sealing by the seal 18, lowering of efficiency of the second cyclone separation by the second cyclone mechanism can be prevented. The seal portion 18 is preferably formed of an elastic material such as synthetic or natural rubber or silicone.

Although during operation of the self-priming liquid pump 21 of the pump portion 2, the bottom portion of the second sludge storage tank 15 is closed in a sealed state by the float valve 17 because the interior of the second cyclone mechanism is in the negative pressure state, the closing is released and the bottom portion is opened, for example, in cases of an arrangement described in (1) or (2) below.

(1) An arrangement where the float valve 17 that opens and closes the bottom portion by either or both of a suction force of the self-priming liquid pump 21 and a buoyant force is disposed at the bottom portion of the second sludge storage tank 15 and the closing of the bottom portion by the float valve 17 is opened when, during stoppage of the separation process, that is, during stoppage of the self-priming liquid pump 21, a weight of the sludge stored above the float valve 17 becomes greater than a sum of the buoyant force of the float valve 17 and the suction force that decreases due to the stoppage of the self-priming liquid pump 21.

That is, whereas while the self-priming liquid pump 21 is operating, the interior of the second cyclone mechanism is in the negative pressure state and thus even when the weight of the sludge stored above the float valve 17 becomes greater than the buoyant force of the float valve 17, the closing by the float valve 17 is maintained, when by stoppage of the self-priming liquid pump 21, the interior of the second cyclone mechanism is no longer in the negative pressure state, the float valve 17 is lowered (sunk) by the weight of the sludge and opens the bottom portion.

(2) An arrangement where the float valve 17 that opens and closes the bottom portion by either or both of a suction force of the self-priming liquid pump 21 and the buoyant force is disposed at the bottom portion of the second sludge storage tank 15 and the closing of the bottom portion by the float valve 17 is opened when, during either or both of stoppage of the self-priming liquid pump 21 and air intake, a liquid level inside the separator of the solid-liquid mixture decreases below the position of the float valve 17.

That is, although while the self-priming liquid pump 21 is in operation, the interior of the second cyclone mechanism is in the negative pressure state and the closing by the float valve 17 is thus maintained even when the weight of the sludge stored above the float valve 17 becomes greater than the buoyant force of the float valve 17, when the self-priming liquid pump 21 stops or when even though the self-priming liquid pump 21 is in operation, air is taken into the separator so that the interior of the second cyclone mechanism is no longer in the negative pressure state and the liquid level inside the separator falls below the position of the bottom portion, the float valve 17 descends (sinks) and the bottom portion is thus opened.

The opening/closing arrangement of the bottom portion of the second sludge storage tank 15 is not restricted to the above-described embodiment, and may be an arrangement where the bottom portion is constantly fixed in the closed state during the separation process and when the separation process is stopped, the second sludge storage tank 15 is accessed from the exterior of the separation portion 1 to open the bottom portion by a mechanical means and thereby discard the sludge, or may be an arrangement where the second sludge storage tank 15 itself is arranged to be detachable and the sludge in the interior is discarded after taking out the second sludge storage tank 15 to the exterior of the separation portion 1.

A bag filter 19 may be disposed inside the first sludge storage tank 14 in accordance with properties of the sludge to be separated. That is, in a case where the sludge is low in viscosity, dehydration and solidification of the stored sludge is facilitated by the bag filter 19 and discarding efficiency is thereby improved. Oppositely, if the sludge is high in viscosity, the bag filter 19 is unnecessary because filter clogging occurs readily.

The self-priming liquid pump 21 employed in the pump portion 2 of the present invention suffices to be a liquid pump with a self-priming arrangement and any type having a liquid feeding performance that is in accordance with a processing amount of the applicable solid-liquid separation can be used without special restriction.

As examples of self-priming liquid pumps developed by the present applicant that can be used in the present invention, those described in Japanese Patent Publication No. 2,665,140, Japanese Patent Publication No. 3,955,224, Japanese Published Unexamined Patent Publication No. 2009-108697, etc., can be cited.

A second embodiment of the present invention shall now be described based on FIG. 7 and FIG. 8.

Figure 7:
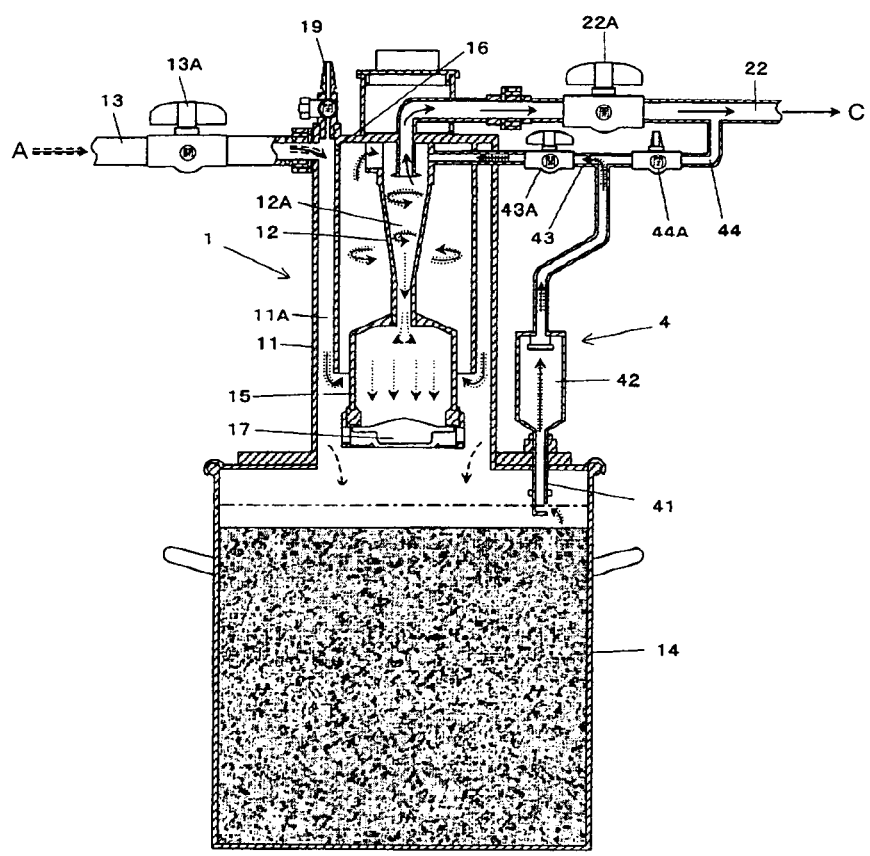
FIG. 7 is a partial sectional view of a second embodiment of the present invention.
Figure 8:
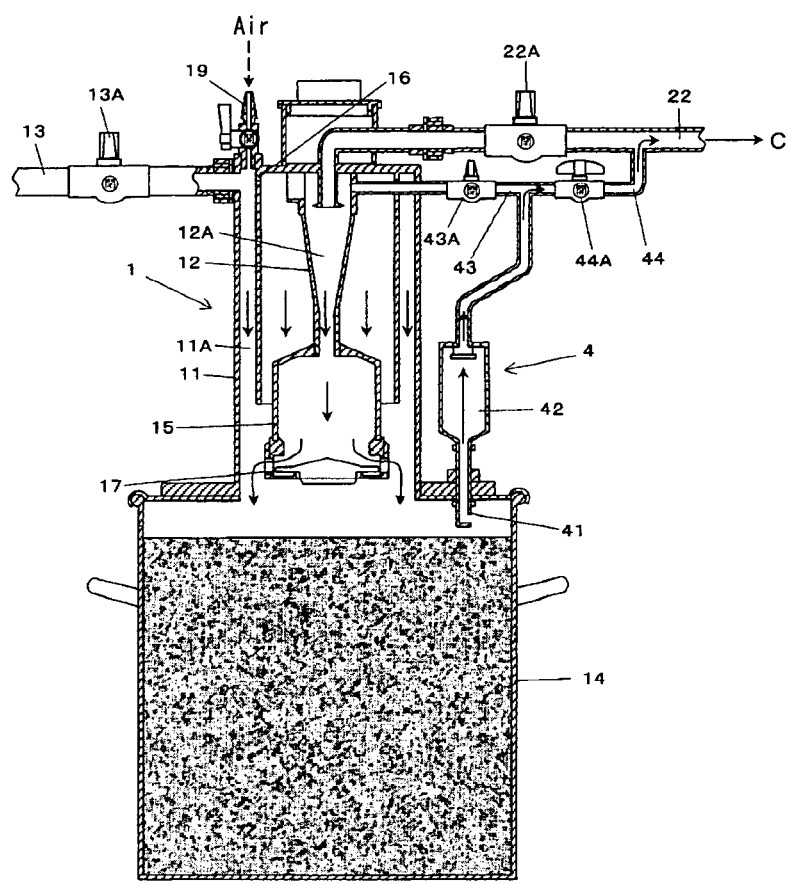
FIG. 8 is a partial sectional view of a state where a valve in the second embodiment shown in FIG. 7 is switched.

As shown in FIG. 7 and FIG. 8, unlike the above-described first embodiment having the compact arrangement, the second embodiment is of a mode arranged to be favorable for performing a separation process on a solid-liquid mixture of a large amount, that is, the first sludge storage tank 14 has a large-scale arrangement, and with this mode, it can be detected whether or not the sludge storage tank 14 is full of the stored sludge and a sludge discarding state can be entered when the tank becomes full.

In the second embodiment, the cyclone separation process acting in the separation portion 1 and the liquid suction process acting in the pump portion 2 are basically the same as those of the first embodiment described above and description of the cyclone separation process shall thus be omitted. Illustration of the pump portion 2 shall also be omitted.

A detection arrangement for the sludge stored in the first sludge storage tank 14 and a discarding arrangement utilized when the tank becomes full of sludge shall be described below.

The separation portion 1 of the separator according to the present invention is provided with a detecting unit 4 for detecting the amount of sludge stored in the first sludge storage tank 14 and the detection of the sludge amount is performed by the detecting unit 4.

The detecting unit 4 has an arrangement including a take-off pipe 41 extend-ably connected to the interior of the first sludge storage tank 14 and taking out the liquid at an upper portion of the interior of the first sludge storage tank 14, a checking portion 42 connected to the take-off pipe 41 and having a transparent portion enabling viewing of a state of a liquid passing through an interior thereof, and a return pipe 43 connecting the checking portion 42 and the first cyclone mechanism or the second cyclone mechanism (the second cyclone cylinder 12 of the second cyclone mechanism in the second embodiment) and returning the liquid taken out from the first sludge storage tank 14 to the interior of the first cyclone mechanism or the interior of the second cyclone mechanism (the interior of the second cyclone cylinder 12 in the second embodiment).

Also, the checking portion 42 of the detecting unit 4 and the self-priming liquid pump 21 of the pump portion 2 are connected by a discharge pipe 44.

Further, an air valve 19, which is capable of being opened and closed and is used to take air into the separation portion 1, is provided.

To detect the sludge amount inside the first sludge storage tank 14, first, an opening/closing valve 43A is "open" as shown in FIG. 7 to put the return pipe 43 in a state enabling passage of liquid. By this operation, the liquid at the upper portion inside the first sludge storage tank 14, that is, the liquid positioned above an upper surface of the stored sludge is taken out by suction from the take-off pipe 41, passes through the checking portion 42, and returned through the return pipe 43 into the second cyclone cylinder 12 to be subject to the second cyclone separation, that is, the liquid is returned to the original cyclone separation process system. In passing through the transparent portion of the checking portion 42, the liquid passing through the detecting unit 4 readily enables the state of the liquid, that is, whether or not sludge is contained in the liquid to be judged visually from the exterior of the separator.

If sludge is not contained in the liquid passing through the checking portion 42, this indicates that the upper surface of the sludge stored in the first sludge storage tank 14 has not yet risen to the position of the take-off pipe 41. The cyclone separation process can thus be continued. In a case where the cyclone separation is to be continued, the opening/closing valve 43A may be left as it is in the "open" state or may be put in a "closed" state until the next detection is to be performed. Also, the opening/closing valve 43A is not restricted to the arrangement of being disposed along the passage of the return pipe 43 and suffices to be disposed at any portion along the liquid passage of the detecting unit 4.

When the amount of sludge stored in the first sludge storage tank 14 increases further and the upper surface of the sludge rises to the position of the take-off pipe 41 (position indicated by an alternate long and short dash line in FIG. 7), the sludge is also taken out by suction along with the liquid from the take-off pipe 41 and it can be visually confirmed that the liquid passing through the checking portion 42 contains sludge.

When the sludge is visually confirmed at the checking portion 42, the cyclone separation process is stopped immediately. Although the cyclone separation process may be stopped by stopping the operation of the self-priming liquid pump 21 of the pump portion 2, the cyclone separation process is preferably stopped with the self-priming liquid pump 21 being in the operating state as it is.

As shown in FIG. 8, the cyclone separation process is stopped by the steps of stopping the introduction of the solid-liquid mixture into the separator by putting an opening/closing valve 13A of the pipe 13 in a "closed" state, bringing external air inside the separator by putting an air valve in an "open" state, stopping the feeding of the cyclone-separated liquid to the pump portion 2 by putting an opening/closing valve 22A of the pipe 22 in a "closed" state, stopping the returning of the liquid from the detecting unit to the cyclone mechanism by putting the opening/closing valve 43A of the return pipe 43 of the detecting unit 4 in the "closed" state, and putting an opening/closing valve 44A of the discharge pipe 44 in an "open" state to discharge the liquid inside the separation portion 1 out of the separator via the take-off pipe 41 and the checking portion 42 of the detecting unit 4 and the discharge pipe 44 by the self-priming liquid pump 21 of the pump portion 2.

In performing the above steps, it is preferable to raise the take-off pipe 41 from the position shown in FIG. 7 to the position shown in FIG. 8 to keep away a take-off port portion of the take-off pipe 41 from the upper surface of the sludge and thereby prevent suction of the sludge that has filled the tank.

By the above steps, not only can the cyclone separation process be stopped but the liquid present inside the separation portion 1 and above the upper surface of the sludge stored in the first sludge storage tank 14 can also be discharged out of the separator. By the discharge of the liquid, the sludge with which the residual amount of the liquid is low remains in the first sludge storage tank 14 and efficient discarding of the sludge is thus enabled.

The discarding of the sludge inside the first sludge storage tank 14 is performed by removing the first sludge storage tank 14 from the separation portion 1.

Besides periodically discarding the sludge stored inside the first sludge storage tank 14 by steps such as those described above, an arrangement is also possible where a bottom portion of the first sludge storage tank 14 is arranged as a conical cone, a twin screw is connected to a lowermost portion of the conical cone, and the stored sludge is carried to the exterior of the first sludge storage tank 14 by actuation of the twin screw to discard.

EFFECT(S) OF THE INVENTION

By the invention according to the first aspect, a solid-liquid separator with self-priming pump can be provided with which wear of the self-priming liquid pump connected to the cyclone mechanism can be prevented and the solid-liquid mixture can be purified at a low cost without requiring a special arrangement (special material or special structure) for the pump.

In particular, sludge with a large specific gravity and large particles can be separated by the first cyclone separation by the first cyclone mechanism positioned at the outer side of the two-stage cyclone mechanism because the swirl diameter is large and the swirl flow is slow, sludge with a small specific gravity and small particles can be separated by the second cyclone separation by the second cyclone mechanism positioned at the inner side because the swirl diameter is small and the swirl flow is fast, and entry of the sludge into the self-priming liquid pump of the pump portion can be suppressed significantly by the arrangement where the separation portion that performs the cyclone separation of the sludge from the solid-liquid mixture by the two-stage cyclone mechanism is connected to the upstream side of the pump portion having the self-priming liquid pump. Wear and damage of the self-priming liquid pump by the sludge can thus be suppressed significantly.

Also, the sludge separated independently by each of the two cyclone mechanisms can be gathered together in a single storage tank (first sludge storage tank) to enable efficient discarding of the sludge. In particular, the sludge stored in the second sludge storage tank, which is positioned at the inner side of the first cyclone mechanism and thus with which taking-out from the main body of the separator is difficult, can be discarded readily.

By the arrangement (1) of the float valve, the sludge separated independently by each of the two cyclone mechanisms can be gathered together in a single storage tank (first sludge storage tank) to enable efficient discarding of the sludge. In particular, the sludge stored in the second sludge storage tank, which is positioned at the inner side of the first cyclone mechanism and thus with which taking-out is difficult, can be dropped into the first sludge storage tank simply by stopping the self-priming liquid pump.

By the arrangement (2) of the float valve, the sludge separated independently by each of the two cyclone mechanisms can be gathered together in a single storage tank (first sludge storage tank) to enable efficient discarding of the sludge. In particular, the sludge stored in the second sludge storage tank, which is positioned at the inner side of the first cyclone mechanism and thus with which taking-out is difficult, can be dropped into the first sludge storage tank simply by performing either or both of stopping of the self-priming liquid pump and taking air into the separation portion.

By the invention according to the second aspect, although when air from the exterior enters into the first cyclone mechanism along with the introduction of the solid-liquid mixture, there is a potential problem that the entered air gradually accumulates at the upper portion of the first cyclone cylinder and the cyclone separation stops functioning when the amount of the accumulated air becomes large, by the air vent hole putting the upper portion of the first cyclone mechanism and the upper portion of the second cyclone mechanism in communication, the air that entered into the first cyclone mechanism can be passed to an upper portion of the second cyclone cylinder through the air vent hole and thereafter be suctioned from the upper portion of the second cyclone cylinder by the self-priming liquid pump and rapidly discharged to the exterior. Lowering of efficiency of cyclone separation can thus be prevented even in the case where air from the exterior entered into the separation portion.

By the invention according to the third aspect, whether or not the sludge storage amount of the first sludge storage tank has reached a predefined amount can readily be checked visually from the exterior of the separator.

By the invention according to the fourth aspect, the task of detecting and checking the sludge amount in the first sludge storage tank can be performed simply by opening the valve that controls the passage of liquid to the detecting unit.

By the invention according to the fifth aspect, the liquid that is present inside the separation portion and above the upper surface of the sludge inside the first sludge storage tank can be discharged so that the sludge with which the residual amount of the liquid is low remains in the first sludge storage tank and efficient discarding of the sludge is enabled.

What is claimed is:

1. A solid-liquid separator comprising:
   a pump portion having a self-priming liquid pump with a suction system at an upstream site of said pump;
   a separation portion connected one of directly and indirectly to said suction system, said separation portion including a first cyclone mechanism having a first cyclone cylinder disposed at an outer side of said separation portion and a second cyclone mechanism in fluid communication with said first cyclone mechanism and having a second cyclone cylinder with a diameter smaller than a diameter of said first cyclone cylinder, said second cyclone cylinders being coaxial to a swirling axis of said first cyclone mechanism and being at an inner side of said first cyclone cylinder;
   an inlet introducing a liquid from an exterior of said separation portion into said first cyclone cylinder for a first cyclone separation by swirling along an inner peripheral wall of said first cyclone cylinder, said second cyclone cylinder being connected to said first cyclone cylinder to receive liquid separated in said first cyclone cylinder and to swirl that liquid along an inner peripheral wall of said second cyclone cylinder;
   a first storage tank disposed below said first cyclone mechanism to store solids separated by said first cyclone mechanism;
   a second storage tank disposed below said second cyclone mechanism to store solids separated by said second cyclone mechanism, said second storage tank being disposed above said first storage tank and having a bottom portion; and
   a float valve movable between open and closed positions in said bottom portion of said second storage tank by at least one of a pump suction force of said pump and a buoyant force of the float valve; in the open position sludge inside said second storage tank being dropped into said first storage tank, said float valve being moved to the open position by one of by a weight of sludge stored above said float valve becoming greater than a sum of the buoyant force and the pump suction force during stoppage of the pump as the pump suction force decreases and of by a liquid level of a liquid-solid mixture decreasing below a position of said bottom portion during at least one of stoppage of said pump and stoppage of air intake;
   whereby, a liquid is introduced into said first and second cyclone cylinders by the pump suction force and swirling flow in said first and second cyclone cylinders separates solids contained in the liquid.

2. The solid-liquid separator according to claim 1 wherein an air vent hole connects in fluid communication an upper portion of said first cyclone mechanism with an upper portion of said second cyclone mechanism.

3. The solid-liquid separator according to claim 2 wherein said separating portion comprises a detecting unit detecting a sludge amount stored in said first storage tank, said detecting unit being disposed outside said first and second cyclone mechanisms and said first storage tank and along a connection pipe connecting said first storage tank with one of said first cyclone cylinder and said second cyclone cylinder, and said detecting unit includes a take-off pipe being a portion of said connection pipe extendably connected to an interior of said first storage tank to take liquid out of an upper portion of said interior of said first storage tank; said detecting unit including a checking portion connected to said take-off pipe and having a transparent portion, said transparent portion enabling viewing of a liquid state passing through an interior of said checking portion; said detecting unit including a return pipe being another portion of said connection pipe connecting said checking portion and one of said first and second cyclone cylinders to return liquid from said first storage tank to one of an interior of said first cyclone cylinder and an interior of said second cyclone cylinder.

4. The solid-liquid separator according to claim 1 wherein said separating portion comprises a detecting unit detecting a sludge amount stored in said first storage tank, said detecting unit being disposed outside said first and second cyclone mechanisms and said first storage tank and along a connection pipe connecting said first storage tank with one of said first cyclone cylinder and said second cyclone cylinder, and said detecting unit includes a take-off pipe being a portion of said connection pipe extendably connected to an interior of said first storage tank to take liquid out of an upper portion of said interior of said first storage tank; said detecting unit including a checking portion connected to said take-off pipe and having a transparent portion enabling viewing of a liquid state passing through an interior thereof; said detecting unit including a return pipe being another portion of said connection pipe connecting said checking portion and one of said first and second cyclone cylinders to return liquid from said first storage tank to one of an interior of said first cyclone cylinder and an interior of said second cyclone cylinder.

5. The solid-liquid separator according to claim 4 wherein an opening/closing valve is connected to and controls passage of liquid into said detecting unit, and is disposed in a liquid passage of said detecting unit.

6. The solid-liquid separator according to claim 3 wherein an opening/closing valve is connected to and controls passage of liquid into said detecting unit, and is disposed in a liquid passage of said detecting unit.

7. The solid-liquid separator according to claim 6 wherein a discharge pipe connects said checking portion of said detecting unit and said pump; and said inlet comprises a stopper halting introduction of liquid when sludge is confirmed to be present in said checking portion of said detecting unit as air is taken into said separation portion and liquid inside said separation portion and above an upper surface of sludge stored in said first storage tank is discharged by said pump via said detecting unit and said discharge pipe, thereby allowing discharging of sludge inside said first storage tank.

8. The solid-liquid separator according to claim 5 wherein a discharge pipe connects said checking portion of said detecting unit and said pump; and said inlet comprises a stopper halting introduction of liquid when sludge is confirmed to be present in said checking portion of said detecting unit as air is taken into said separation portion and liquid inside said separation portion and above an upper surface of sludge stored in said first storage tank is discharged by said pump via said detecting unit and said discharge pipe, thereby allowing discharging of sludge inside said first storage tank.

9. The solid-liquid separator according to claim 4 wherein
a discharge pipe connects said checking portion of said detecting unit and said pump; and
said inlet comprises a stopper halting introduction of liquid when sludge is confirmed to be present in said checking portion of said detecting unit as air is taken into said separation portion and liquid inside said separation portion and above an upper surface of sludge stored in said first storage tank is discharged by said pump via said detecting unit and said discharge pipe, thereby allowing discharging of sludge inside said first storage tank.

10. The solid-liquid separator according to claim 3 wherein
a discharge pipe connects said checking portion of said detecting unit and said pump; and
said inlet comprises a stopper halting introduction of liquid when sludge is confirmed to be present in said checking portion of said detecting unit as air is taken into said separation portion and liquid inside said separation portion and above an upper surface of sludge stored in said first storage tank is discharged by said pump via said detecting unit and said discharge pipe, thereby allowing discharging of sludge inside said first storage tank.

11. The solid-liquid separator according to claim 1 wherein said float valve is moved to the open position by the weight of sludge stored above said float valve being greater than a sum of the buoyant force and the pump suction force during stoppage of the pump as the pump suction force decreases.

12. The solid-liquid separator according to claim 1 wherein said float valve is moved to the open position by the liquid level of the liquid-solid mixture decreasing below the positions of said bottom portion during at least one of stoppage of said pump and stoppage of air intake.

* * * * *